May 23, 1961 L. E. WOLSKE 2,985,096

ROTISSERIE APPARATUS

Filed Nov. 5, 1956 3 Sheets-Sheet 1

INVENTOR.
Lawrence E. Wolske,
BY Brown, Jackson, Boettcher & Dienner
Attys

May 23, 1961 L. E. WOLSKE 2,985,096
ROTISSERIE APPARATUS
Filed Nov. 5, 1956 3 Sheets-Sheet 2
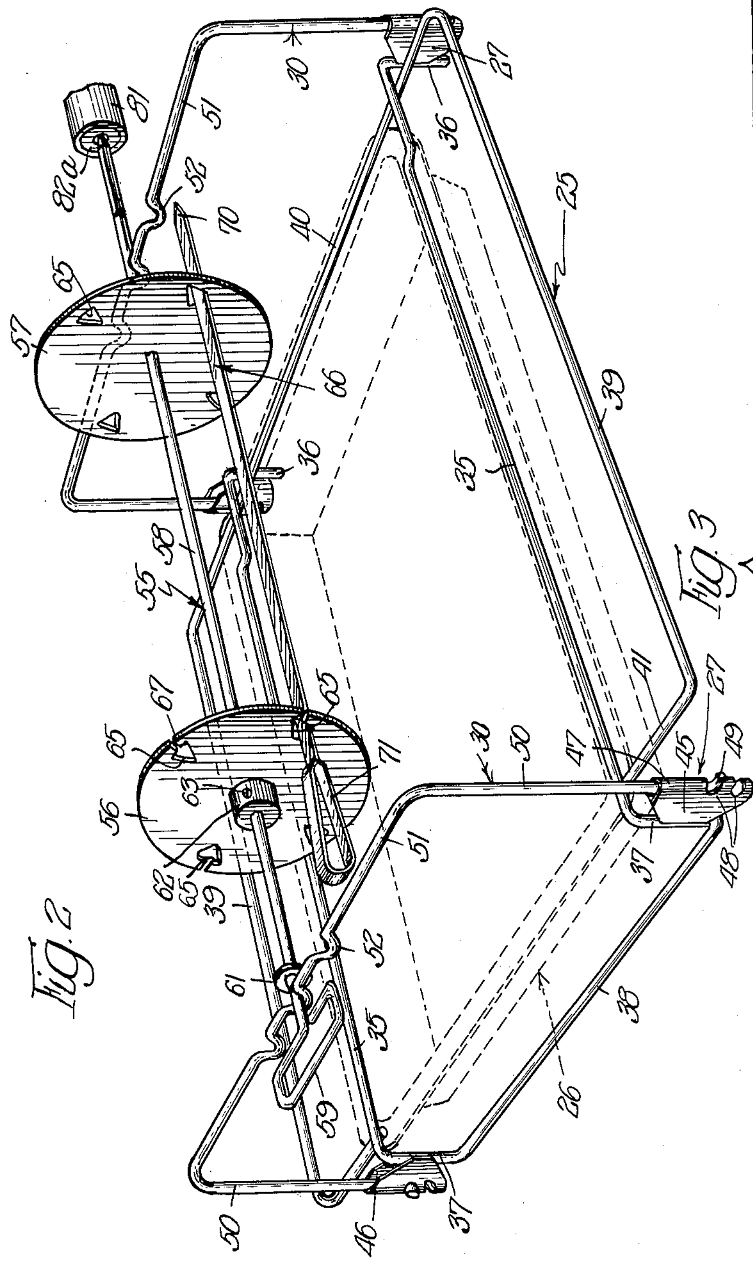
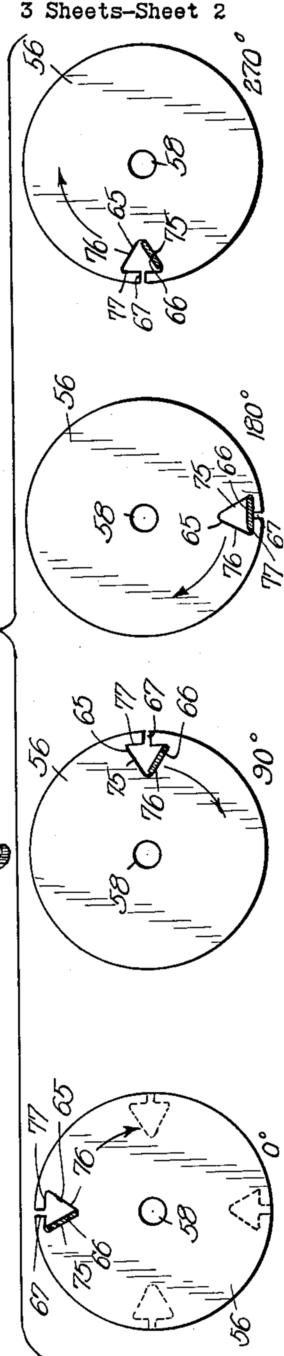
INVENTOR.
Lawrence E. Wolske,
BY Brown, Jackson
Boettcher & Dienner
Attys ROTISSERIE APPARATUS
Filed Nov. 5, 1956 3 Sheets-Sheet 3
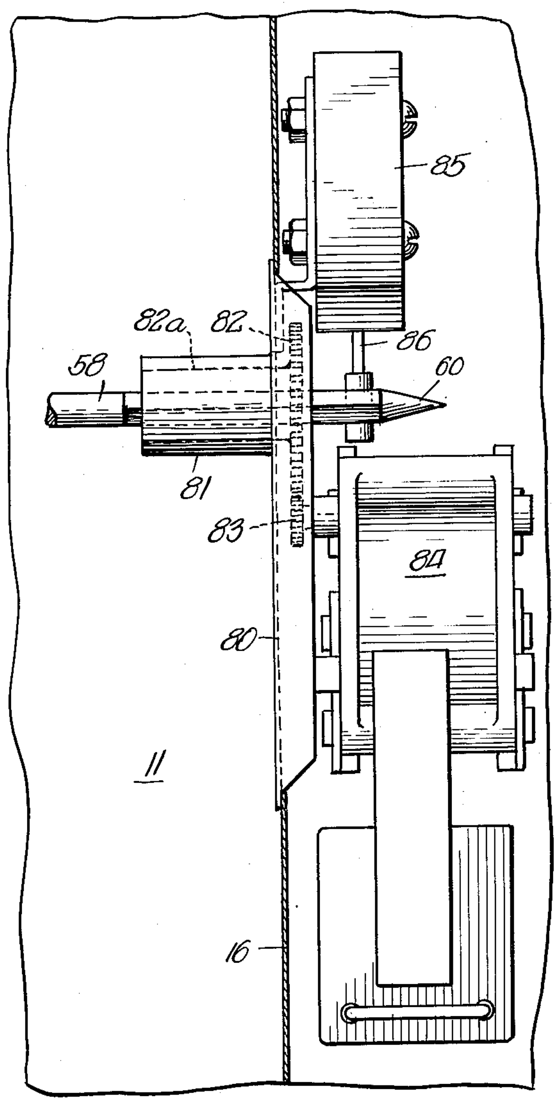
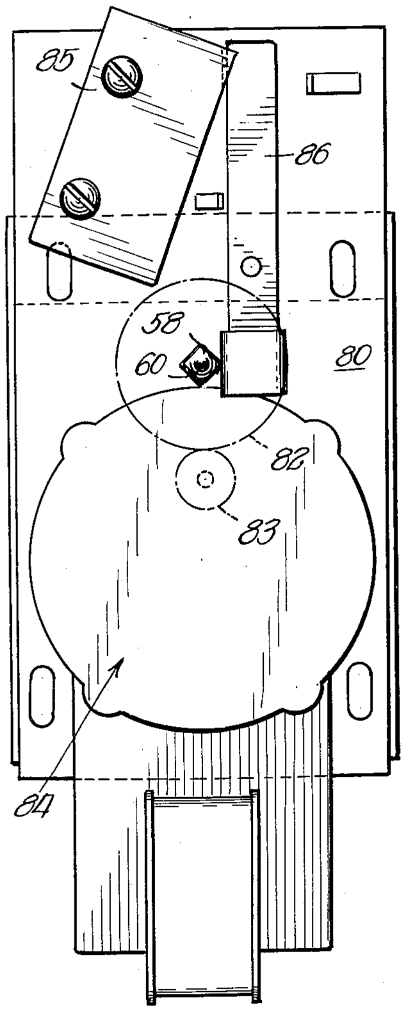
INVENTOR.
Lawrence E. Wolske,
BY Mann, Jackson, Brottcher & Diener
Attys

United States Patent Office 2,985,096

Patented May 23, 1961

1

2,985,096

ROTISSERIE APPARATUS

Lawrence E. Wolske, Benton Harbor, Mich., assignor to Whirlpool Corporation, a corporation of Delaware Filed Nov. 5, 1956, Ser. No. 620,402

8 Claims. (Cl. 99—421)

This invention relates generally to rotisseries and improvements therein, and more specifically to rotisserie apparatus for rotatably supporting foods, such as meat and the like, in proximity to suitable heating means for roasting or broiling the same.

Specifically, the apparatus of my invention embodies multiple food holding elements suitably mounted about a rotatable spit and adapted to provide compound rotational movement to food supported upon such holding elements. The device is particularly adapted for association with a conventional oven cavity or broiler compartment of a conventional cooking stove or the like. Drive means are embodied in the end compartmenting wall of such oven cavity for removable association with the spit of my improved rotisserie apparatus whereby the latter may be rotatably driven and conveniently associated and disassociated with the oven as desired for broiling and roasting, or for conventional use of the oven according to normal practice.

It is the primary object of the present invention to provide a rotisserie apparatus having means providing compound rotational movement of food holding elements thereby to provide uniform distribution of heat and uniform browning of foods.

It is a further object of my present invention to provide rotisserie apparatus of the character aforesaid which is simple and flexible in its operation.

It is another object of the present invention to provide an improved rotisserie apparatus which is neat in appearance, easy to clean after use, and which is economical to manufacture.

It is a still further object of my present invention to provide rotisserie apparatus having means providing compound rotational movement to foods while employing a minimum number of moving parts.

It is a still further object of my present invention to provide a rotisserie apparatus which is easily assembled and disassembled and requires minimum storage space.

An addition object of my present invention is to provide a new and improved rotisserie apparatus having improved operational characteristics whereby the uniform roasting and broiling of foods thereon is accomplished in a simplified and efficient manner.

The above and further object features and advantages of my invention will appear to those familiar in the art from the following detailed description and specifications of a preferred form thereof illustrated in the accompanying drawings.

In the drawings:

Figure 1 is a front elevational view illustrating the improved rotisserie apparatus of this invention in its associated or mounted relation with a conventional oven compartment, or the like;

Figure 2 is a perspective view of the rotisserie apparatus of this invention illustrating details and assembled relation of the several elements therein;

Figure 3 is a schematic representation of a skewer supporting disc element involved in the apparatus of Figure 2, and particularly illustrating the compound rotational movement of such skewers in response to rotational driving of the supporting discs;

Figure 4 is an enlarged partial cross-sectional view taken through the rear wall of the oven compartment at substantially line 4—4 in Figure 1 to show the drive means associated with the rotisserie of this invention; and Figure 5 is a rear elevational view of the drive mechanism set forth in Figure 4.

2

Figure 1:
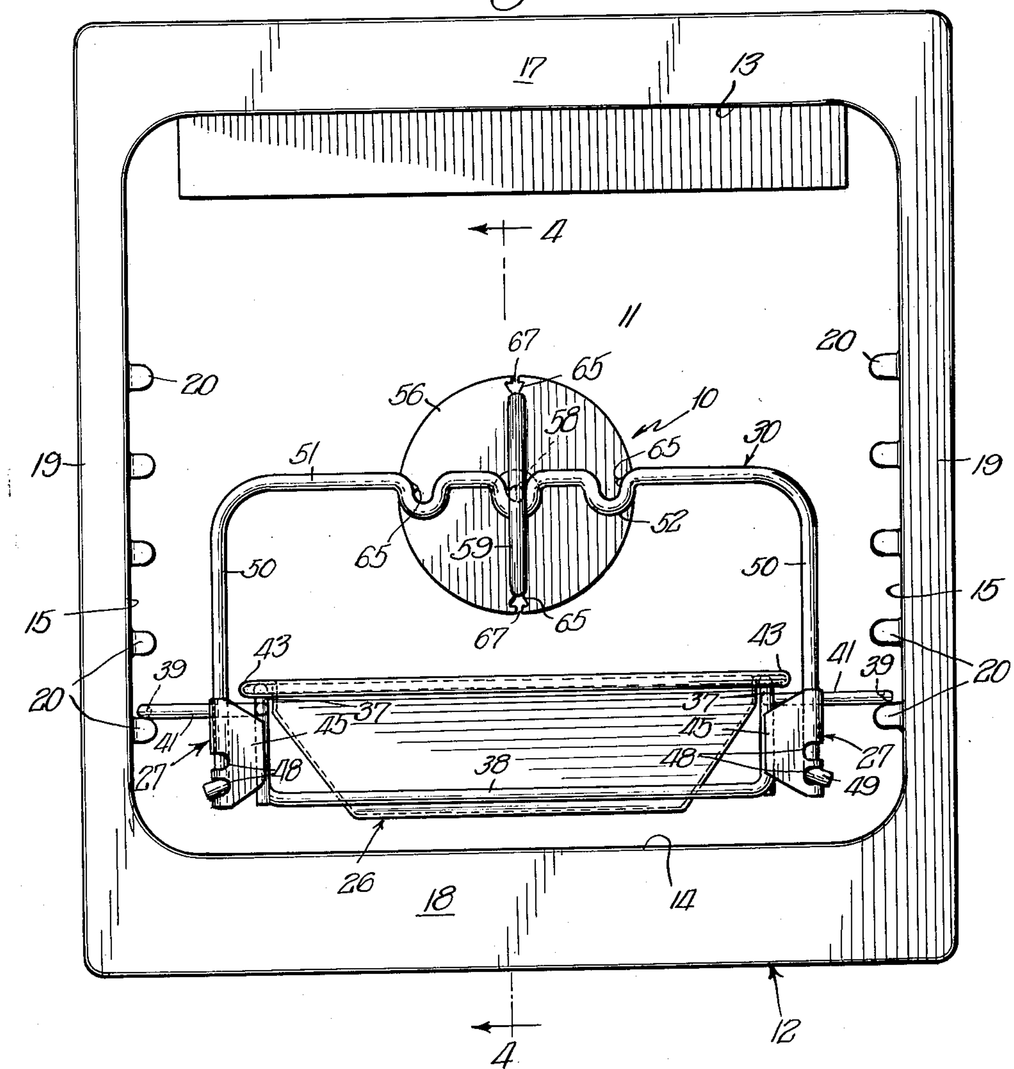

Turning now to the features and aspects of the improved rotisserie apparatus of this invention, and in particular reflection of Figures 1 and 2 of the drawings, it will be regarded that my rotisserie apparatus, indicated generally by numeral 10, resides within an oven chamber or cavity 11 formed by an oven liner 12 of conventional character.

The oven liner 12 includes spaced top, bottom, and side walls 13, 14, and 15, respectively. Such walls 13, 14, and 15 are disposed in a rectangular relation to define vertical and horizontal limits for a cavity or oven chamber 11. As best shown in Figure 4 of the drawings, the innermost end of cavity 11 is closed over by a rear wall 16. The top and bottom walls 13 and 14 are respectively turned upwardly and downwardly to provide flange portions 17 and 18 adjacent the forward end of cavity 11. Such flanges merge and join with similar flanges 19, 19 formed at the forward edges of side walls 15, 15; these flanges defining an opening for access into the oven cavity 11. This opening is normally closed off by a conventional oven door (not shown).

The side walls 15 are provided with suitably formed horizontal projections or ribs 20 spaced to provide bearing surfaces for the support of a conventional rack or shelf utilized to carry or support food within the oven cavity 11. In the present invention the lowermost projections 20 are utilized to provide a bearing surface for a rack assembly 25 arranged to support a drip pan 26 and provided at its forward and rearward corners with upright brackets 27 upon which are mounted a pair of spit supports 30, 30.

The rack assembly 25 includes a pair of laterally spaced parallel side rails 35, 35 which are turned downwardly at their rearward ends to form legs 36, 36. Such rails 35 are also turned downwardly at their forward ends to form leg portions 37, 37 integrally joined by a cross connecting rail or tie 38 as shown in Figure 2 of the drawings. Disposed in spaced parallelism to rails 35 are outrigger rails 39, 39 which are interconnected at one end by a transverse tie rod 40; such tie 40 transversing rails 35, 35 and being rigidly joined thereto at the points of intersection with such rails, as by spot welds or the like. At the forward ends of the outrigger rails 39 are inwardly turned arms 41, 41 which extend to and beneath the side rails 35, 35 whereat the same are spot welded in rigid junction therewith. The drip pan 26 slides along the side rails 35, 35; the drip pan being formulated with outwardly extending and laterally disposed lip portions 43, 43 which engage the upper edge of the side rails 35, 35. The outrigger rails 39 are adapted to engage and slide along the bearing edge of the lowermost projections 20 which extend inwardly of side walls 15 in the oven cavity, as shown in particular in Figure 1 of the drawings.

The brackets 27 for holding the spit supports 30 are mounted one to each of the downwardly disposed leg portions 36 and 37 substantially at the four corners of the rack assembly, as previously described. It will be regarded that each bracket 27 includes a frontal wall portion 45, and a parallel spaced rearward wall portion 46 which wall portions are integrally joined by curved end wall 47. Apertures or openings 48, 48 are located in the curved wall 47 of each bracket for receiving an outwardly turned end portion 49 formed at the lowermost ends of vertical leg elements 50, 50 of each spit support 30.

The spit supports 30 in addition to the vertically extending legs 50, 50 include a horizontal support rail portion 51 disposed transversely with respect to the upright axes of the legs 50, 50 and comprising an integral continuation of such legs. Each spit support in effect, therefore, comprises an inverted U-shaped member. The supporting rail portions 51 of the two spit supports 30 are each formed with three indentations or dimples 52 intermediate their ends, the middle one of which defines an axis of rotation for a spit means 55 which extends between and across the spit supports as will be described presently. In this regard, it will be appreciated that when mounted in brackets 27, as described, the several indentations or dimples 52 of the spit support are registeringly aligned with at least one of said dimples being located substantially along the longitudinal center line of the rack assembly 25.

The spit means 55 includes a pair of skewer discs 56 and 57 which are disposed in spaced parallelism near opposite ends of a central rod-like spit member 58. The spit member 58 is formed, by suitable bending, to include a rectangular loop-like handle means 59 adjacent its forward end and is pointed at its inner end 60, as best shown in Figure 4. A positioning washer 61 is affixed transversely to the spit member 58 between the handle member 59 and the first skewer supporting disc 56. The skewer supporting discs may each be rigidly affixed to the shaft of the spit member 58 as by welding, or by other connective devices, or may be made adjustable by employing an adjusting collar 62 and holding screw means 63, as is shown, associated with the disc member 56 in Figure 2 of the drawings.

Each disc 56 and 57 is provided with a plurality of triangular shaped openings 65 to receive skewer members 66. At least one of these skewer discs, and preferably the forwardmost disc 56 thereof, is provided with peripheral slots 67 communicating with each of the triangular openings 65 therein. These slots are formed so that the skewers 66 must be inserted angularly thereinto. They are then placed in proper alignment with correspondingly disposed opening 65 in the other or rearwardmost disc 57. This slotted construction provides a simple means for locking the skewers in position when loaded with food while effectively preventing their disengagement from the discs 56 and 57 upon rotation of the latter with the spit member 58.

As illustrated in the present disclosure, each disc 56 and 57 is provided with four triangular shaped openings 65, each for the reception of a single skewer means 66. Each skewer means comprises an elongated flattened metal rod of a substantially rectangular cross section as seen best in Figure 3. The inner end of each skewer 66 is pointed as, at 70, for thrusting the same into meat or food to be prepared by the rotisserie. The outermost end of each skewer 66 is suitably bent reentrantly to formulate a handle means 71 with the length of the skewer being slightly less than the distance between the upright spit supports 30, so that the same may clear the spit supports when rotating with discs 56 and 57. The flat or rectangular cross section for the skewers provides a convenient medium for preventing food from rotating relative to the skewer; which is especially important if the food is not pierced substantially through its center of gravity and thus is not properly balanced on the skewer.

It will be recalled that the formulation of the handle member 59 on the spit member 58 is substantially as a rectangular closed loop. This configuration of the handle means provides a simple expedient in conjunction with the outboard depressions 52, 52 of the adjacent spit support 30 for locking the spit against rotation during loading and unloading operations. With reference to this last feature, by placing the loop of the handle means 59 so that the same bridges the two outboard depressions 52 in the forward spit support 30, the spit member 58 is positively locked against rotational movement.

With particular reference now to Figure 3 of the drawings, I have therein illustrated in schematic representation the compound movement of a skewer member 66 during rotational driving of the discs 56 and 57. It will be understood from this illustration that during one revolution of the discs 56 and 57 each skewer rotates upon its own axis through substantially 540°, or 1½ revolutions, due to the novel arrangement of the triangular openings 65. Looking at the schematic showing, Figure 3, for example, wherein the skewer and disc arrangement is illustrated with one skewer 66 and one opening 65 for purposes of simplicity in explanation, it will be appreciated that the left-hand figure therein shows opening 65 in an approximate 12 o'clock position with the skewer means 66 therein resting against wall 75 of the triangular opening. After approximately 90° of rotation of the disc members opening 65 resides in substantially a 3 o'clock position with the skewer 66 having moved from wall 75 to the opposite wall 76 of the triangular opening. Upon continued rotation for substantially another 90°, skewer and opening means now residing in substantially a 6 o'clock position, the skewer 66 has moved against wall 77 of the triangular opening. As the rotation of the discs continues to 270°, or a 9 o'clock position, for opening 65, the skewer means 66 flops backwardly to again engage wall 75 of the opening, against which wall it remains until after passage of opening 65 through the 12 o'clock position, as initially described.

From this arrangement it will be understood that due to the flat cross section of the skewers 66 and the triangular shape of the openings 65 in the discs 56 and 57, the skewers are caused to turn about their own axes within the triangular openings 65 as the disc is revolved with the rotation of the spit member 58. Following the revolution of a disc in substantially 90° increments, as illustrated in Figure 3, it will be seen that the skewer has a rotational movement of approximately 1½ revolutions for each 360° of revolution of the disc members.

With a conventional heating element mounted in the top of the oven cavity 11, all sides of the meat or food on the skewer are uniformly exposed to heat during each 360° of rotation for the supporting discs. This simplified expedient for causing the food supporting skewers to rotate relative to the rotatably driven supporting discs is submitted to be a novel advancement in the rotisserie art. It will be appreciated also that by so employing the triangular-shaped openings, the movement of the skewer members therewithin during rotation of the discs is effected in a simple and direct manner without the need for separate drive means connected with the skewers.

Turning now to Figures 4 and 5 of the drawings, I have therein illustrated a simplified arrangement for rotatably driving of the spit means 55. As seen in Figure 4, for example, the innermost wall 16 of the oven cavity is provided with an opening into which is mounted a supporting plate 80 distinguished by a projecting cylindrical boss 81 that extends into the oven cavity 11. The boss 81 serves as a bearing support for a hub **82*a* comprising an integral extension of a drive gear 82. The spit member 58 passes coaxially through the hub 82*a* of the drive gear 82 associated with a reducing gear 83 and a drive motor 84 suitably secured to and supported by the bracket means 80. The portion of the spit 58 which passes through the hub 82*a* is formed into a non-circular section which may be square, hexagonal, or otherwise, and the aperture through the hub is matingly formed, whereby the spit makes a positive connection with the gear 82 for rotation therewith. A micro switch 85 is also located on the bracket means 80 and is operated by means of an actuating lever 86 depending interferingly with the spit member 58 in its passage through the collar means 81. Thus, upon inserting the spit means 58 through the central opening in the boss 81, the pointed end 60 thereon engages the lever 86 wih a camming action to trip micro switch lever 85 for energizing motor means 84. In this manner, automatic drive of the spit assembly 55 is brought about. It will be appreciated, of course, that upon withdrawing the spit member 58, the motor will be de-energized by reverse actuation of micro switch 85**.

From the foregoing it is believed that those familiar with the art will appreciate the advanced improvements which mark the present rotisserie device of this invention. Further, while I have herein shown and described the principles and features of my improved rotisserie device in conjunction with a particular embodiment, nevertheless, such is subject to numerous changes, modifications, and substitutions of equivalents with departure from the spirit and scope of my invention. As a consequence, it is not my intention to be limited to the particular form of rotisserie device herein shown and described, except as may appear in the following appended claims.

I claim:

1. A rotisserie device for use in an oven or broiler compartment of a conventional cook stove, comprising, a rack means including spaced parallel and upwardly extending support members, spit means mounted across said support members for rotation, a pair of spaced disc members carried by said spit means each having a plurality of angular openings formed therethrough with intersecting sides of equal extent, said openings being spaced radially outward of said spit means, said disc members being mounted with said openings therein registeringly aligned, skewer means insertable into said openings for support by said disc means, said skewer means having spaced planar faces and a multi-angular cross section, means for rotating said spit means thereby to carry said skewer means along a circular orbit concentric of the axis of said spit means, alternate planar faces of said skewer means engaging successive sides of said openings as such skewer means are moved through said orbit thereby to cause said skewer means to revolve about individual axes paralleling the axis of said spit means.

2. The combination as set forth in claim 1 in which said openings are three-sided and triangular and said skewer means have a substantially rectangular cross section.

3. In a rotisserie device for use in an oven cavity of a conventional cook stove and including a rack means for supporting a rotatably driven spit member, the combination comprising, plural food supporting skewer elements supported in concentric array about said spit member, plural disc members carried intermediate the ends of said spit member for supporting said skewer elements, and means for causing said skewer elements to revolve about their own axes as they rotate with said disc and spit members formulated by plural multi-angular openings formed in said disc members with such openings of the disc members being registeringly aligned for reception of the skewer elements in spaced parallelism to the axis of the spit member, the skewer elements having a substantially rectangular cross section for engaging planar sides of said openings extending between the formation angles thereof, with opposite faces of said skewer elements engaging successive sides of said openings during and throughout the rotational movement of the skewer elements with said spit member thus to cause said skewer elements to rotate independently of the spit member.

4. A rotisserie device for use with a conventional cook stove having an oven or broiler compartment therein defined by spaced top, bottom and side walls interjoined at one end by a rear wall with the other end thereof closable by door means, the combination comprising, a rack assembly slidably insertable into the compartment, a rotatable spit means mounted centrally of said compartment, spit support elements carried at opposite ends of said rack assembly for supporting said spit means and defining a rotational axis therefor, means for removably mounting said spit member on said support elements, additional means for locking said spit member against rotation, as selected, drive means for rotating said spit member located outwardly of said compartment and behind the rear wall thereof, means extending through such rear wall for the inserted reception of one end of said spit member and providing driving connection with said spit member, a pair of disc members carried in spaced parallelism adjacent opposite ends of said spit member with the planes of said disc members lying transverse to the longitudinal axis of said spit member, plural multi-angular openings formed through said disc members adjacent the periphery of the latter, the said disc members being aligned with said openings therein registering, additional openings formed inwardly from the periphery of at least one of said disc members communicating with the multi-angular openings therein, plural skewer members adapted to be mounted between said disc elements in spaced radial parallelism to said spit member, said skewer elements being insertable through the multi-angular openings of the other of said disc members and receivable in the multi-angular openings of said one disc member via said other openings extending inwardly from the periphery thereof, said skewer elements having spaced faces adapted to engage straight line portions of the periphery of said multi-angular openings extending between the angles of formation therefor, the rotation of said spit means by said drive means causing said skewer elements to revolve within said multi-angular openings such that the alternate faces of said skewer element engage successive planar peripheral portions of said multi-angular openings, the resulting revolution of said skewer members so effected being in excess of 360° for each revolution of said spit member.

5. A rotisserie including a supporting frame, spit means mounted on said supporting frame for rotation, a pair of spaced support members carried by said spit means each having a plurality of apertures formed therein, the apertures in at least one of said support members being formed with angularly related edge portions, said apertures being spaced radially outward of said spit means, said support members being mounted with their respective apertures at least approximately aligned, skewer means inserted into said aligned apertures for support by said support members, each said skewer means having at least a portion thereof engaged in an aperture of said one support member and formed with angularly related face portions of less extent and of less number than said edge portions, means for rotating said spit means thereby to carry said skewer means along a circular orbit concentric of the axis of said spit means, successive face portions of said skewer means engaging successive edge portions of said apertures as such skewer means are moved through said orbit thereby to cause said skewer means to revolve about individual axes paralleling the axis of said spit means.

6. In a rotisserie, a supporting frame, means on said frame revoluble about an axis including spaced supporting members each having a plurality of apertures formed therein spaced from said axis and having intersecting angularly related edge portions, a skewer member extending through said apertures, said skewer member having a multi-angular cross section forming face portions of less extent than said edge portions engaging in series said edge portions upon said rotation of the supporting members, the number of said face portions being at least one less than the number of said edge portions, and means for rotating said revoluble means whereby the successive engagement of said face portions with successive edge portions causes rotation of said skewer member about its londitudinal axis with intermittent motion at a rotational velocity differing from that imparted to said revoluble means.

7. A rotisserie apparatus, comprising: a supporting frame, means on said frame including spaced supporting members rotatable about a common axis, each having a plurality of apertures formed therein spaced from said axis and having intersecting angularly related edge portions, a skewer member loosely held in said apertures, said skewer member having a multi-angular cross section forming face portions of less extent than said edge portions engaging in series said edge portions upon said rotation of the supporting members, the number of said face portions being at least one less than the number of said edge portions; and means for rotating said supporting members about said common axis whereby the successive engagement of said face portions with successive edge portions causes rotation of the skewer member about its longitudinal axis step-wise within said apertures.

8. The apparatus of claim 7 wherein said aperture edge portions are all of substantially equal length in order than said step-wise rotation will be substantially uniform.

References Cited in the file of this patent

UNITED STATES PATENTS

| | | |
|---|---|---|
| 1,634,142 | Hammond | June 28, 1927 |
| 1,718,961 | Humphrey | July 2, 1929 |
| 2,324,233 | Parsons | July 13, 1943 |
| 2,330,132 | Martin et al. | Sept. 21, 1943 |
| 2,618,730 | Panken | Nov. 18, 1952 |
| 2,747,497 | Brown | May 29, 1956 |

FOREIGN PATENTS

| | | |
|---|---|---|
| 426,139 | France | June 28, 1911 |
| 487,467 | Germany | Dec. 12, 1929 |